US012808675B2

(12) United States Patent
Nakamura et al.

(10) Patent No.: US 12,808,675 B2
(45) Date of Patent: Nov. 24, 2026

(54) MODEL GENERATION SYSTEM

(71) Applicant: NTT DOCOMO, INC., Tokyo (JP)

(72) Inventors: Yusuke Nakamura, Tokyo (JP); Akira Yamada, Tokyo (JP); Takashi Suzuki, Tokyo (JP); Shin Ishiguro, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 19/148,167

(22) PCT Filed: Dec. 6, 2023

(86) PCT No.: PCT/JP2023/043735
§ 371 (c)(1),
(2) Date: Jul. 15, 2025

(87) PCT Pub. No.: WO2024/202259
PCT Pub. Date: Oct. 3, 2024

(65) Prior Publication Data

US 2026/0227190 A1 Aug. 6, 2026

(30) Foreign Application Priority Data

Mar. 29, 2023 (JP) ................................ 2023-053405

(51) Int. Cl.
*G01C 21/34* (2006.01)

(52) U.S. Cl.
CPC ..... *G01C 21/3415* (2013.01); *G01C 21/3446* (2013.01)

(58) Field of Classification Search
CPC ............ G01C 21/3484; G01C 21/3415; G01C 21/3617; G01C 21/34; G01C 21/3407; G01C 21/3446; G06Q 10/047
See application file for complete search history.

(56) References Cited

U.S. PATENT DOCUMENTS

2017/0146351 A1* 5/2017 von Cavallar .......... H04W 4/60
2019/0078902 A1* 3/2019 Zhong ................ G06Q 30/0207
(Continued)

FOREIGN PATENT DOCUMENTS

JP 2020-64537 A 4/2020

OTHER PUBLICATIONS

International Preliminary Report on Patentability and Written Opinion issued Oct. 9, 2025 in PCT/JP2023/043735, 7 pages.
(Continued)

*Primary Examiner* — Kenneth J Malkowski
(74) *Attorney, Agent, or Firm* — Oblon, McClelland, Maier & Neustadt, L.L.P.

(57) ABSTRACT

To generate a recommendation condition derivation model, this model generation system is provided with: a recommendation condition candidate generation unit that acquires a plurality of recommendation condition candidates; a user movement estimation unit that acquires user movement estimation information on the basis of each of the recommendation condition candidates and transition of positions of users indicated by movement demand information; a recommendation condition extraction unit that extracts, as an optimum recommendation condition, a recommendation condition candidate with the largest degree of achievement for a given target value on the basis of the user movement estimation information for each recommendation condition candidate; and a recommendation condition derivation model training unit that performs machine learning of a recommendation condition derivation model using training data with target information, attribute information relating to each user, and user position information as explanatory variables and the optimum recommendation condition as an objective variable.

8 Claims, 15 Drawing Sheets

(56) References Cited

U.S. PATENT DOCUMENTS

| | | | | |
|---|---|---|---|---|
| 2019/0186938 | A1* | 6/2019 | Pasukonis | G01C 21/3423 |
| 2020/0378778 | A1* | 12/2020 | Glazberg | B60T 8/17 |
| 2021/0341300 | A1* | 11/2021 | Beaurepaire | G01C 21/3492 |

OTHER PUBLICATIONS

International Search Report mailed on Feb. 20, 2024 in PCT/JP2023/043735 filed on Dec. 6, 2023, citing reference 15 therein, 2 pages.

* cited by examiner (a)

(b)

rc

| RECOMMENDATION DELIVERY TIME | PASSING NODE | PASSING TIME | GENDER | AGE | INCENTIVE (pt) | RECOMMENDED NODE |
|---|---|---|---|---|---|---|
| 2023/2/21 9:00 | A | 2023/2/21 8:00:00 - 2023/2/21 | M | THIRTIES | 50 | D,E |
| : | : | : | : | : | : | : |

rc1 rc2 rc3

(c)

tv

| TARGET ITEM | TARGET VALUE |
|---|---|
| ALLOWED CONGESTION LENGTH BETWEEN C AND F | 30km |
| ALLOWED CONGESTION LENGTH BETWEEN C AND D | 10km |

td

*Fig.4* up1

| USER ID | LATITUDE | LONGITUDE | TIME STAMP |
|---|---|---|---|
| 001 | 35.566 | 138.854 | 2023/2/21 9:00 |
| 001 | 35.563 | 139.235 | 2023/2/21 9:03 |
| .. | .. | .. | .. |

ni

| NODE NAME | LATITUDE OF CENTER | LONGITUDE OF CENTER | RADIUS(m) |
|---|---|---|---|
| A | 35.763 | 139.124 | 1000 |
| B | 35.963 | 139.235 | 1000 |
| .. | .. | .. | .. |

up2

| USER ID | NODE | TIME STAMP |
|---|---|---|
| 001 | - | 2023/2/21 9:00 |
| 001 | B | 2023/2/21 9:03 |
| .. | .. | .. |

up

| USER ID | PASSING NODE | PASSING TIME |
|---|---|---|
| 001 | B | 2023/2/21 9:03 |
| 002 | A | 2023/2/21 8:23 |
| .. | .. | .. |

Fig.5 up

| USER ID | PASSING NODE | PASSING TIME |
|---|---|---|
| 001 | B | 2023/2/21 9:03 |
| 002 | A | 2023/2/21 8:23 |
| 001 | C | 2023/2/21 9:34 |
| 001 | F | 2023/2/21 9:56 |
| 001 | G | 2023/2/21 10:01 |
| : | : | : |

tr

| USER ID | PASSING NODE | PASSING TIME |
|---|---|---|
| 001 | B | 2023/2/21 9:03 |
| 001 | C | 2023/2/21 9:34 |
| 001 | F | 2023/2/21 9:56 |
| 001 | G | 2023/2/21 10:01 |
| : | : | : |

Fig.6 tr

| USER ID | PASSING NODE | PASSING TIME |
|---|---|---|
| 001 | B | 2023/2/21 9:03 |
| 001 | C | 2023/2/21 9:34 |
| 001 | F | 2023/2/21 9:56 |
| 001 | G | 2023/2/21 10:01 |
| 002 | B | 2023/2/21 9:05 |
| 002 | C | 2023/2/21 9:37 |
| 002 | D | 2023/2/21 9:50 |
| 002 | E | 2023/2/21 10:00 |
| 002 | F | 2023/2/21 10:20 |
| : | : | : |

ur

| USER ID | RECOMMENDATION RESPONSE |
|---|---|
| 001 | No |
| 002 | Yes |
| : | : |

*Fig.8*

| No. | RECOMMENDATION DELIVERY TIME | PASSING NODE | PASSING TIME | GENDER | AGE | INCENTIVE (pt) | RECOMMENDED NODE |
|---|---|---|---|---|---|---|---|
| 1 | 2023/2/21 9:00 | A | 2023/2/21 7:00 - 2023/2/21 9:00 | M | THIRTIES | 50 | D,E |
| 2 | 2023/2/21 9:00 | A | 2023/2/21 7:00 - 2023/2/21 9:00 | M | THIRTIES | 100 | D,E |
| 3 | 2023/2/21 9:00 | A | 2023/2/21 7:00 - 2023/2/21 9:00 | M | THIRTIES | 150 | D,E |
| 4 | 2023/2/21 9:00 | A | 2023/2/21 7:00 - 2023/2/21 9:00 | M | THIRTIES | 200 | D,E |
| 5 | 2023/2/21 10:00 | A | 2023/2/21 7:00 - 2023/2/21 9:00 | M | THIRTIES | 50 | D,E |
| 6 | 2023/2/21 10:00 | A | 2023/2/21 7:00 - 2023/2/21 9:00 | M | THIRTIES | 100 | D,E |
| 7 | 2023/2/21 10:00 | A | 2023/2/21 7:00 - 2023/2/21 9:00 | M | THIRTIES | 150 | D,E |
| 8 | 2023/2/21 10:00 | A | 2023/2/21 7:00 - 2023/2/21 9:00 | M | THIRTIES | 200 | D,E |
| 9 | 2023/2/21 10:00 | A | 2023/2/21 7:00 - 2023/2/21 9:00 | M | THIRTIES | 50 | D,E |
| 10 | 2023/2/21 11:00 | A | 2023/2/21 7:00 - 2023/2/21 9:00 | M | THIRTIES | 100 | D,E |
| 11 | 2023/2/21 11:00 | A | 2023/2/21 7:00 - 2023/2/21 9:00 | M | THIRTIES | 150 | D,E |
| 12 | 2023/2/21 11:00 | A | 2023/2/21 7:00 - 2023/2/21 9:00 | M | THIRTIES | 200 | D,E |
| : | : | : | : | : | : | : | : |

| USER ID | PASSING NODE | PASSING TIME |
|---|---|---|
| 001 | B | 2023/2/21 9:03 |
| 001 | C | 2023/2/21 9:34 |
| 001 | F | 2023/2/21 9:56 |
| 001 | G | 2023/2/21 10:01 |
| : | : | : |

Fig.10 td tv

| TARGET INFORMATION | |
|---|---|
| ITEM | TARGET VALUE |
| ALLOWED CONGESTION LENGTH BETWEEN C AND F | 30 |
| ALLOWED CONGESTION LENGTH BETWEEN C AND D | 10 |

→ ev

| RECOMMENDATION CONDITION CANDIDATE (No) | VALUE OF EVALUATION FUNCTION |
|---|---|
| 1 | 10 |
| 2 | 40 |
| 3 | -10 |
| 4 | 2 |
| : | : |

MODEL GENERATION SYSTEM

TECHNICAL FIELD

The present invention relates to a model generation system.

BACKGROUND ART

Techniques for providing users with recommendation information have been studied in order to encourage the users to change their behavior regarding their moving routes for the purpose of achieving target values relating to a moving state that occurs as a result of the users' movements. In order to provide suitable recommendation information, it is desirable to obtain optimum recommendation conditions for the content of recommendation information, a user serving as a target, and the like. For that purpose, a model that outputs recommendation conditions on the basis of input of various types of information relating to recommendation information is useful. For example, Patent Literature 1 below describes a technique of creating a model for presenting recommended behavior content to a user by machine learning.

CITATION LIST

Patent Literature

[Patent Literature 1] Japanese Unexamined Patent Publication No. 2020-64537

SUMMARY OF INVENTION

Technical Problem

According to a model that outputs recommendation conditions on the basis of a target value to be achieved as a result of behavior change and position information representing a user's current state, the model can be applied to cases in which the target value and the current state change in real time. However, a large amount of training data for use in machine learning is required to build the model.

Thus, the present invention has been made in consideration of the above problems, and an object thereof is to obtain training data for training a machine learning model that outputs recommendation conditions, and further to obtain a model using the obtained training data.

Solution to Problem

In order to solve the above problems, a model generation system according to an aspect of the present disclosure is a model generation system configured to generate a recommendation condition derivation model that derives recommendation conditions including at least attribute information of a target user to whom recommendation information relating to a moving route is provided and information indicating the moving route, the system including: a recommendation condition candidate generation unit configured to acquire a plurality of recommendation condition candidates with the information indicating the moving route as a constraint condition; a user movement estimation unit configured to acquire user movement estimation information by estimating movements of users on the basis of transition of positions of each user indicated by movement demand information and each of the recommendation condition candidates, the movement demand information being information that is generated on the basis of user position information including the positions through which the users have passed and passing times at which they have passed through the positions and that indicates the transition of the positions through which each user has passed, the movements of the users in the user movement estimation information being changed from movements indicated by the transition of the user positions on the basis of recommendation response estimation information, and the recommendation response estimation information being information that indicates whether or not the users will move along the moving route indicated in the recommendation information in a case in which the users are provided with the recommendation information indicated in the recommendation condition candidates and is acquired on the basis of a recommendation response model that outputs the recommendation response estimation information with at least the user position information including the positions through which the users have passed and the passing times and the recommendation conditions as input; a recommendation condition extraction unit configured to extract, as an optimum recommendation condition, a recommendation condition candidate with the largest degree of achievement for a given target value relating to the movements of the users on the basis of the user movement estimation information for each of the recommendation condition candidates; and a recommendation condition derivation model training unit configured to perform machine learning of the recommendation condition derivation model using training data in which target information relating to the movements of the users including the target value, attribute information of each user, and the user position information are explanatory variables, and the optimum recommendation condition is an objective variable.

According to the above aspect, user estimation information can be obtained by estimating the movements of the users when the recommendation condition candidates are issued by simulating the movements of the users to which the separately obtained recommendation response model is applied, and the degree of achievement for the target value for each of the recommendation condition candidates can be determined on the basis of the user estimation information, and thus the recommendation condition candidate with the largest degree of achievement for the target value can be extracted as the optimum recommendation condition.

In addition, since the training data can be configured with the target information, the attribute information of each user, and the user position information as the explanatory variables, and the optimum recommendation condition as the objective variable, it is possible to obtain a large amount of training data for machine learning of the recommendation information derivation model.

Advantageous Effects of Invention

It is possible to obtain training data for training a machine learning model that outputs recommendation conditions, and further to obtain the model using the obtained training data.

BRIEF DESCRIPTION OF DRAWINGS

FIG. 3(*b*) is a diagram showing an example of a recommendation condition relating to recommendation information transmitted to the user for achieving a target value in the road network shown in FIG. 3(*a*). FIG. 3(*c*) is a diagram showing an example of target information.

FIG. 4 is a diagram for describing a process of converting user position information indicated by latitude and longitude into user position information indicated by a node.

FIG. 5 is a diagram for describing an example of a process of acquiring movement result information on the basis of the user position information.

FIG. 6 is a diagram showing an example of generation of recommendation response information.

FIG. 8 is a diagram showing an example of recommendation condition candidates.

FIG. 10 is a diagram showing a process of extracting an optimum recommendation condition from the recommendation condition candidates on the basis of a degree of achievement for the target value included in the target information.

DESCRIPTION OF EMBODIMENTS

An embodiment of a model generation system according to the present invention will be described with reference to the drawings. Also, the same portions will be denoted by the same reference signs and repeated description thereof will be omitted, if possible.

Figure 1:
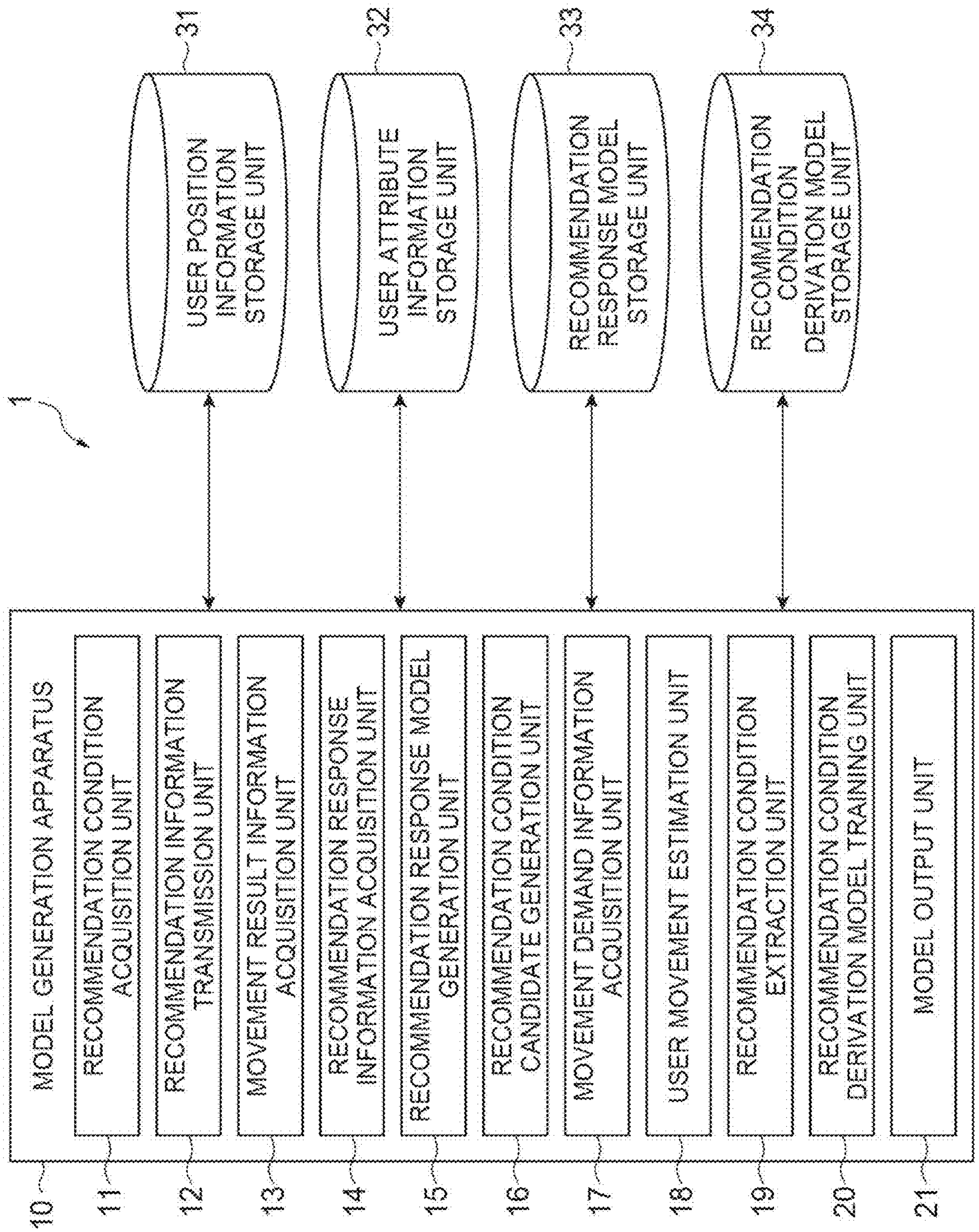
FIG. 1 is a block diagram showing a functional configuration of a model generation system and a model generation apparatus according to the present embodiment.

FIG. 1 is a diagram showing a functional configuration of a model generation system and a model generation apparatus according to the present embodiment. The model generation system 1 of the present embodiment is a system for generating a recommendation condition derivation model that derives a recommendation condition including at least attribute information of a target user to whom recommendation information relating to a travel route is provided and information indicating the travel route, and is, as an example, configured by a model generation apparatus 10.

As shown in FIG. 1, the model generation apparatus 10 functionally includes a recommendation condition acquisition unit 11, a recommendation information transmission unit 12, a movement result information acquisition unit 13, a recommendation response information acquisition unit 14, a recommendation response model generation unit 15, a recommendation condition candidate generation unit 16, a movement demand information acquisition unit 17, a user movement estimation unit 18, a recommendation condition extraction unit 19, a recommendation condition derivation model training unit 20, and a model output unit 21. Each of these functional units 11 to 21 may be configured in one apparatus as illustrated in FIG. 1, or may be distributed among a plurality of apparatuses.

Each of the functional units 11 to 21 of the model generation apparatus 10 is configured to be able to access storage means (storage) such as a user position information storage unit 31, a user attribute information storage unit 32, a recommendation response model storage unit 33, and a recommendation condition derivation model storage unit 34. Each of the storage units 31 to 34 may be provided in the model generation apparatus 10 or may be configured in other apparatuses that are configured to be accessible from the model generation apparatus 10, as illustrated in FIG. 1.

Figure 2:
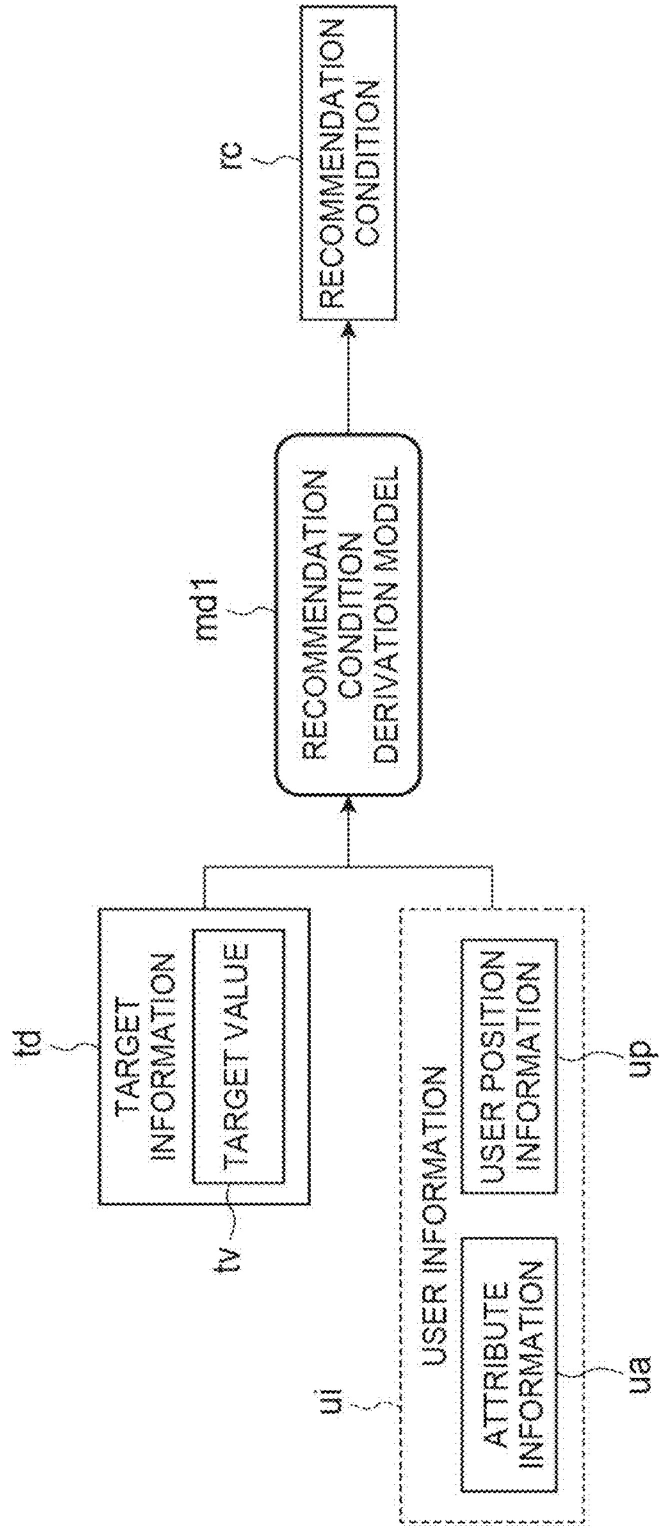
FIG. 2 is a diagram showing a schematic configuration of a recommendation condition derivation model.

FIG. 2 is a diagram showing a schematic configuration of the recommendation condition derivation model. As illustrated in FIG. 2, a recommendation condition derivation model md1 is a model that outputs recommendation condition rc in response to input of target information td and user information ui, and is configured by machine learning. The recommendation condition derivation model md1 is, for example, a model configured to include a neural network.

The target information td is information indicating a target to be achieved for the user's movement, and includes a target value tv. The target value tv is a numerical value indicating the target. The target information td may be, for example, an allowed congestion length between points. In that case, the target value tv indicates the allowed congestion length. The target information td may be a key performance indicator (KPI).

The user information ui is information about each of users and may include user attribute information ua and user position information up. The attribute information ua is information that represents characteristics of a user, and may include, for example, information such as gender and age associated with user IDs that identify the users.

The user position information up is information including positions through which each user has passed and their times of passing through the positions, and includes, for example, the positions and the times associated with the user IDs that identify the users. Position information indicating a position through which a user has passed may be expressed, for example, by latitude and longitude, or by a node corresponding to a single point position or a fixed range. Also, the position information may be expressed by an arbitrarily set geofence, a standard regional mesh, or the like.

The recommendation condition rc includes various conditions relating to recommendation information for making recommendations regarding the user's moving route, and includes at least the attribute information of the target user to whom the recommendation information is to be provided and information indicating the recommended moving route.

Figure 3:
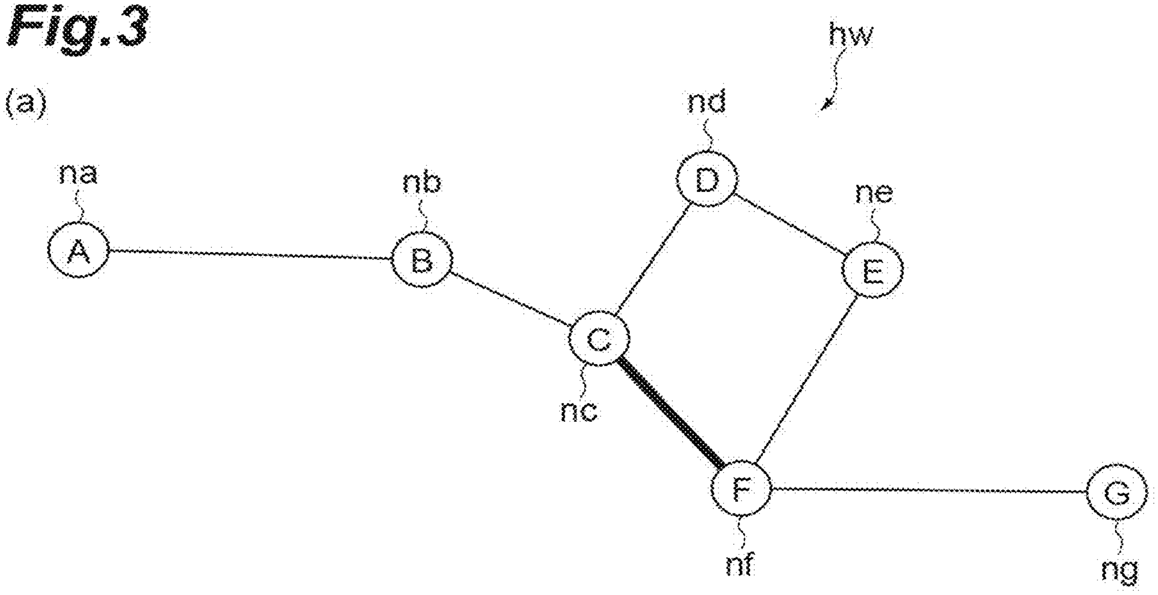
FIG. 3(*a*) is a diagram illustrating a road network configured of nodes and links, which is a target of a user's movement in the present embodiment.

The recommendation condition rc will be specifically described with reference to FIG. 3. FIG. 3(*a*) is a diagram illustrating a road network configured of nodes and links, which is a target of the user's movement in the present embodiment. FIG. 3(*b*) is a diagram showing an example of the recommendation condition rc relating to the recommendation information transmitted to the user to achieve the target value tv in the road network hw shown in FIG. 3(*a*). FIG. 3(*c*) is a diagram showing an example of the target information.

As shown in FIG. 3(*a*), the road network hw includes nodes na, nb, nc, nd, ne, nf, and ng, which are interconnected by the links.

Also, as shown in FIG. 3(*b*), the recommendation condition rc includes a recommendation delivery time rc1, which is a time when the recommendation information is delivered, a target user information rc2 regarding the target user to whom the recommendation information is delivered, and a recommendation content rc3 representing the content of the recommendation information.

The target user information rc2 includes passing nodes, passing times, gender, and age. That is, according to recommendation condition rc, the recommendation information is transmitted to a user who has passed through a node indicated in the passing nodes at a time indicated in the passing times, and who has the gender and the age indicated in the target user information rc2.

The recommendation content rc3 includes a recommended node and an incentive (for example, points) given to the user who follows the recommendation information. The recommended node represents a node through which the user is to pass in order to achieve the target value indicated in the target information.

As shown in FIG. 3(*c*), the target information td includes a target item and a target value tv. Specifically, the target information td includes, for example, a target value "30 km" associated with a target item "allowed congestion length between C and F." That is, "30 km," which is a length of congestion allowed between a node C and a node F is set as a target for the user's movement. Also, the target information td includes a target value "10 km" associated with a target item "allowed congestion length between C and D."

Recommended nodes in the recommendation content rc3 may be set to achieve the target value tv included in the target information td. That is, a node D and a node E are set as the recommended nodes with the intention of limiting the number of users moving between the node C and the node F and between the node C and the node D, and causing users who have passed through a node A to pass through the node D and the node E.

FIG. 4 is a diagram for describing a process of converting the user position information indicated by latitude and longitude into the user position information indicated by the nodes. As described above, the manner in which positions are expressed in the position information is not limited, and in the present embodiment, the positions are expressed by the nodes. When the user position information expressed by latitude and longitude is acquired, a management apparatus (not shown, the management apparatus may be the model generation apparatus 10) that manages the user position information converts the latitude and longitude into a node.

The management apparatus acquires, for example, position information up1 of each user, which is measured and transmitted by a terminal carried by each user. The position information up1 includes latitude and longitude associated with the user ID and time stamp. The management apparatus refers to node information ni, which includes a position (latitude and longitude) of each node and a radius representing a range of each node, extracts a node corresponding to each position (latitude and longitude) included in the position information up1, and replaces the latitude and longitude with the extracted node as shown in the position information up2. In addition, the management apparatus may store the user position information up, which is obtained by extracting only records in which the latitude and longitude can be replaced with the nodes, in the user location information storage unit 31.

Next, each of the functional units of the model generation apparatus 10 will be described with reference back to FIG. 1. The recommendation condition acquisition unit 11 inputs the target information, the attribute information ua of each user, and the user position information up to the recommendation condition derivation model to acquire the recommendation condition rc. Here, the recommendation condition acquisition unit 11 acquires the recommendation condition rc from the recommendation condition derivation model that has not been trained or is in the process of being updated.

The recommendation condition acquisition unit 11 may refer to the recommendation condition derivation model stored in the recommendation condition derivation model storage unit 34 and acquire the recommendation condition rc. The recommendation condition derivation model storage unit 34 is a storage means that stores the recommendation condition derivation model.

In the present embodiment, the recommendation condition acquisition unit 11 acquires the attribute information ua of each user, which is stored in advance in the user attribute information storage unit 32. The user attribute information storage unit 32 is a storage means that stores the attribute information ua of each user in advance.

In the present embodiment, the recommendation condition acquisition unit 11 acquires the user position information up acquired and stored in the user position information storage unit 31. The user position information storage unit 31 is a storage means that stores the user position information up in advance.

The recommendation information transmission unit 12 transmits the recommendation information to the target user indicated in the recommendation condition rc on the basis of the recommendation condition rc obtained by the recommendation condition acquisition unit 11. Specifically, the recommendation information transmission unit 12 transmits the recommendation information including the content shown in the recommendation content rc3 to a terminal of the user corresponding to the target user information rc2 specified in the recommendation condition rc at the delivery time shown in the recommendation delivery time rc1.

The movement result information acquisition unit 13 acquires movement result information indicating transition of the positions passed by each user on the basis of the user position information up of each user. Specifically, the movement result information acquisition unit 13 acquires the movement result information indicating movements of each user on the basis of the position information indicating that each user has passed through each node during predetermined times after the time when the recommendation information was issued, which is generated in response to the recommendation information issued by the recommendation information transmission unit 12.

FIG. 5 is a diagram describing an example of a process of acquiring the movement result information on the basis of the user position information up. The movement result information acquisition unit 13 acquires the user position information up of each user during predetermined times after the time when the recommendation information has been transmitted by the recommendation information transmission unit 12. The movement result information acquisition unit 13 may acquire only the user position information up of the users who have received the recommendation information. The movement result information acquisition unit 13 extracts records for each user from the user position information up and acquires the movement result information tr that indicates the transition of the positions of each user. According to the movement result information tr, it is understood that the user with a user ID "001" passed through each node in the order of nodes B, C, F, and G.

Referring again to FIG. 1, the recommendation response information acquisition unit 14 acquires recommendation response information, which indicates whether or not the user who has received the recommendation information followed the moving route indicated in the recommendation information, on the basis of the movement result information tr. Referring to FIG. 6, an example of a process of acquiring the recommendation response information will be specifically described.

FIG. 6 is a diagram showing an example of generating the recommendation response information. The recommendation response information acquisition unit 14 acquires the recommendation response information by determining whether or not the user has moved along the moving route indicated in the recommendation information on the basis of the movement result information tr. Specifically, the recommendation response information acquisition unit 14 acquires the recommended nodes "D and E" by referring to the recommendation condition rc adopted by the recommendation information transmission unit 12. Then, the recommendation response information acquisition unit 14 refers to the user position information of each user in the movement result information tr and determines whether or not there is a record indicating that the user has passed through the recommended nodes "D and E."

Since the user with the user ID "001" has no record including the user position information indicating that the user has passed through the node D or the node E, the recommendation response information acquisition unit 14 generates a recommendation response "No" for the user "001." On the other hand, since the user with the user ID "002" has a record including the user position information indicating that the user has passed through the node D or the node E, the recommendation response information acquisition unit 14 generates a recommendation response "Yes" for the user "002." Then, the recommendation response information acquisition unit 14 acquires the recommendation response information ur including the recommendation responses of the user "001" and the user "002."

Thus, since the determination of whether or not the user has moved along the moving route is performed on the basis of the movement result information tr, it is possible to obtain highly accurate recommendation response information ur.

Also, the recommendation response information acquisition unit 14 may acquire the recommendation response information ur on the basis of information transmitted by the user who has received the recommendation. Specifically, the recommendation response information acquisition unit 14 may acquire the recommendation response information ur by receiving information indicating that an operation indicating a response to the recommendation has been performed in the terminal of the user who has received the recommendation. For example, a button for notifying that the user has responded to the recommendation may be displayed on a screen of an application running on the terminal of the user who has received the recommendation, a service provided to the terminal, and the like, and in response to the user pressing the button, information indicating that the user has responded to the recommendation may be transmitted from the terminal of the user to the recommendation response information acquisition unit 14.

In this way, since the determination of whether or not the user has moved along the moving route is performed on the basis of the information received from the terminal of the user, the recommendation response information ur can be easily obtained.

Referring again to FIG. 1, the recommendation response model generation unit 15 generates the recommendation response model by machine learning using training data in which the attribute information and the user position information of the users who have received the recommendation information, and the recommendation condition are used as explanatory variables, and the recommendation response information ur of the users is used as objective variables.

Figure 7:
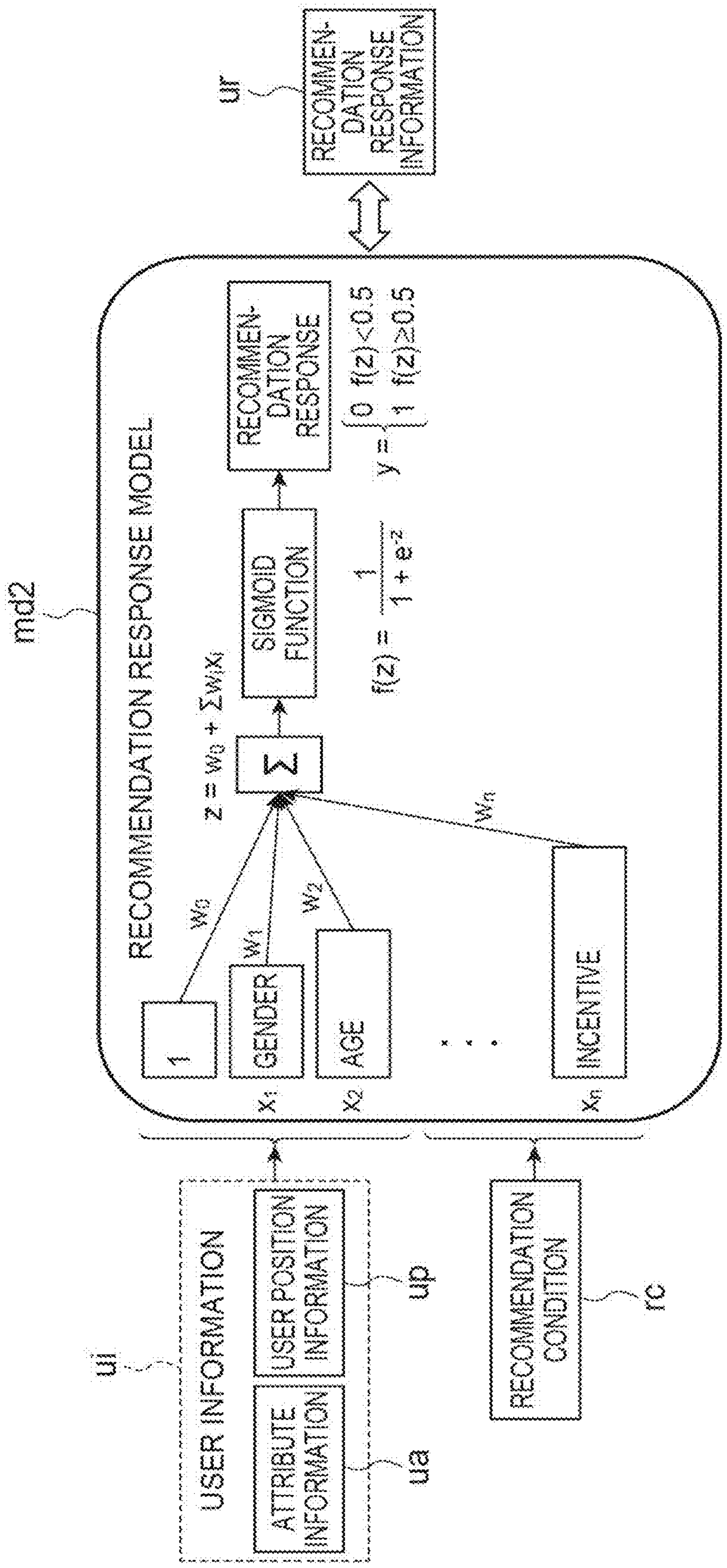
FIG. 7 is a diagram for describing a process of generating a recommendation response model by machine learning.

FIG. 7 is a diagram for describing a process of generating the recommendation response model by machine learning. The recommendation response model may be a binary classification model that performs prediction using the attribute information ua and the user position information up of the users who have received the recommendation information, and the recommendation condition rc as the explanatory variables, and the recommendation responses of each user as the objective variables. In the present embodiment, a recommendation response model md2 may be configured of a logistic regression model that outputs the user attribute information ua, the user position information up, and the recommendation condition rc as the explanatory variables, and the recommendation response information ur based on the probabilities that the users will follow the moving route indicated by the recommendation information as the objective variables.

As shown in FIG. 7, the recommendation response model generation unit 15 inputs each element of the user attribute information ua, the user position information up, and the recommendation condition rc as the explanatory variables $x_1, x_2, \ldots,$ and $x_n$ to the recommendation response model md2. In the recommendation response model md2, by applying a weight $w_i$ corresponding to each of the input explanatory variables $x_i$ (i=1 to n), the calculation result z is obtained according to the following formula.

$$z = w_0 + \sum w_i x_i$$

Further, by inputting the calculation result z into the following sigmoid function, the probability f(z) of the recommendation response is obtained.

$$f(z) = 1/(1 + e^{-z})$$

Then, the recommendation response y is output by determining whether the probability f(z) is 0. 5 or more. That is, in the case of $f(z)<0.5$, y=0 (recommendation response: No), and in the case of $f(z)\geq 0.5$, y=1 (recommendation response: Yes).

The recommendation response model generation unit 15 performs training of the recommendation response model md2 by using the recommendation response information ur corresponding to the user information ui of the users and the recommendation condition rc input as the explanatory variables as teacher data for the objective variables, and adjusting the weight $w_i$ so that an error of the recommendation response y with respect to the teacher data is reduced.

The recommendation response model generation unit 15 may store the trained recommendation response model md2 in the recommendation response model storage unit 33. The recommendation response model storage unit 33 is a storage means configured to store the recommendation response model that has already been trained or is in the process of being trained. Also, the recommendation response model md2 may be configured to output the probability f(z) as a recommendation response rate.

As described above, since the recommendation response information ur indicating whether or not the users have followed the recommendation information can be obtained on the basis of the transition of the positions of the users who have received the recommendation information, the training data using the user information ui and the recommendation condition rc as the explanatory variables and the recommendation response information ur as the objective variable can be constructed. Accordingly, it is possible to generate the recommendation response model md2 by machine learning using the constructed training data.

Referring again to FIG. 1, the recommendation condition candidate generation unit 16 acquires a plurality of recommendation condition candidates with the information indicating the moving route as a constraint condition. Specifically, the recommendation condition candidate generation unit 16 may generate the plurality of recommendation condition candidates obtained by varying values of items of conditions other than the constraint conditions relating to the moving route randomly or within a certain range.

FIG. 8 is a diagram showing an example of the recommendation condition candidates generated by the recommendation condition candidate generation unit 16. The recommendation condition candidate generation unit 16 may generate the plurality of recommendation condition candidates using a method called grid search. That is, the recommendation condition candidate generation unit 16 generates the plurality of recommendation condition candidates so that, in the recommendation condition rc, with the recommended nodes indicating the nodes through which the users are recommended to pass used as the constraint condition, all possible combinations of values for each of the other items are included.

As illustrated in FIG. 8, the recommendation condition candidate generation unit 16 generates the plurality of recommendation condition candidates (No. 1, 2, 3, . . . , 12, . . . ) so that the nodes “D and E” through which the users are recommended to pass are included as the recommended nodes, and all possible combinations of values for each of the other items such as recommendation delivery times, passing nodes, passing times, genders, ages, incentives, and the like are included. By applying the grid search method in this way, it is possible to easily generate a large number of recommendation condition candidates to be used as the training data for machine learning of the recommendation condition derivation model.

Referring again to FIG. 1, the movement demand information acquisition unit 17 acquires movement demand information indicating the transition of the positions through which each user has passed on the basis of the user position information that includes the positions through which the users have passed and the passing times through which the users have passed the positions. Specifically, similarly to the movement result information acquisition unit 13, the movement demand information acquisition unit 17 generates the movement result information by extracting the transition of the positions through which each user has passed on the basis of the user position information up of each user.

Since the movement result information is information indicating transition of the nodes of the users who have received the recommendation information, whereas the movement demand information is original information for simulating movements of the users who have received the recommendation condition candidates, the movement demand information acquisition unit 17 generates the movement demand information on the basis of the user position information up of each user who has not received the recommendation information.

The user movement estimation unit 18 acquires user movement estimation information by estimating the movements of the users on the basis of the transition of the positions of each user and each of the recommendation condition candidates indicated by movement demand information md. Specifically, the user movement estimation unit 18 acquires the user movement estimation information as a result of simulation by simulating the movements of the users on the basis of the movement demand information and each of the recommendation condition candidates.

Figure 9:
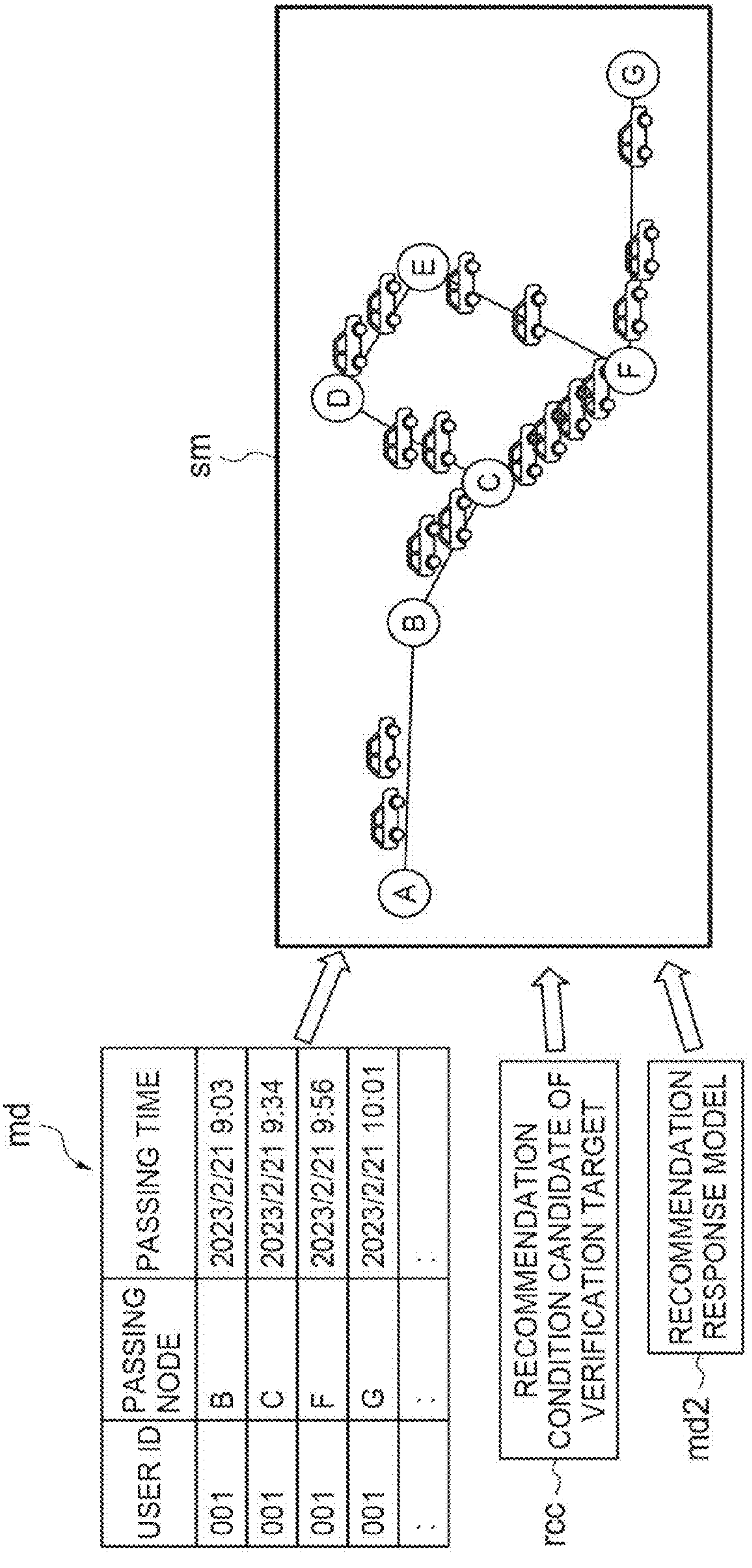
FIG. 9 is a diagram showing a schematic diagram of a simulation of the user's movement based on movement demand information, the recommendation condition candidates, and the recommendation response model, and acquisition of user movement estimation information.

FIG. 9 is a diagram schematically showing simulation of movement of a user and acquisition of the user movement estimation information based on the movement demand information, the recommendation condition candidates, and the recommendation response model. As shown in FIG. 9, the user movement estimation unit 18 acquires the movement demand information md generated by the movement demand information acquisition unit 17, a recommendation condition candidate rcc serving as one verification target among the plurality of recommendation condition candidates generated by the recommendation condition candidate generation unit 16, and the recommendation response model md2 generated by the recommendation response model generation unit 15. Then, the user movement estimation unit 18 sets the user as an agent and simulates movement of the agent using the acquired information.

Specifically, the user movement estimation unit 18 simulates the movement of the agent at an arbitrary time step (for example, in units of 1 second) starting from an arbitrary time (for example, Feb. 21, 2023, 09:00) as a simulation start time.

In principle, the movement of the agent is defined as departing from the “passing node” in the movement demand information md at the “passing time” and moving along the set links. Also, if the time at which the agent arrives at a certain node is later than the “passing time” of the node, the agent is assumed to pass through the node as is, and if the time at which the agent arrives at the node is earlier than the “passing time,” the agent is assumed to wait at the node until the passing time.

Then, for each time step, the user movement estimation unit 18 extracts agents that corresponds to the recommendation delivery time, the passing node, the passing time, the gender, and the age indicated in the recommendation condition candidate rcc to be verified.

Here, the movement of the agent (user) is changed from the movement indicated by the movement demand information md on the basis of the recommendation response estimation information. The recommendation response estimation information is information indicating whether or not the user will move along the moving route indicated in the recommendation information when the user is provided with the recommendation information indicated in the recommendation condition candidate rcc. By inputting the user information ui of the user corresponding to the agent and the recommendation condition candidate rcc into the recommendation response model md2, the user movement estimation unit 18 acquires the recommendation response output from the recommendation response model md2 as the recommendation response estimation information.

The user movement estimation unit 18 acquires the recommendation response estimation information for the extracted agent on the basis of the recommendation response model md2 for each agent, and simulates the nodes through which the agent passes on the basis of the recommendation response estimation information. That is, if the recommendation response estimation information indicates that the agent will respond to the recommendation (recommendation response y=1), the user movement estimation unit 18 changes the passing nodes so that the agent passes through the recommended nodes indicated in the recommendation condition candidate rcc. In addition, If the recommendation response estimation information indicates that the agent does not respond to the recommendation (recommendation response y=0), the user movement estimation unit 18 moves the agent in accordance with the movement demand information. Also, the last passing node (destination) of each agent is not changed.

With the above simulation, the user movement estimation unit 18 acquires the user movement estimation information sm as the simulation result. The user movement estimation unit 18 acquires the user movement estimation information for each of all recommendation condition candidates rcc as verification targets.

The recommendation condition extraction unit 19 extracts the recommendation condition candidate with the largest degree of achievement for a given target value for the user's movement as the optimum recommendation condition on the basis of the user movement estimation information sm of each recommendation condition candidate.

FIG. 10 is a diagram showing a process of extracting the optimum recommendation condition from the recommendation condition candidates on the basis of the degree of achievement for the target value included in the target information. In one example shown in FIG. 10, the target information td includes the target value tv "30 km" for the target item "allowed congestion length between C and F," and the target value tv "10 km" for the target item "allowed congestion length between C and D." In such a case, an evaluation function f, which represents the degree of achievement for a given target value for the user's movement, is set, for example, as follows.

$$f=W1([\text{maximum congestion length between } C \text{ and } F]-[\text{allowed congestion length between } C \text{ and } F])+W2([\text{maximum congestion length between } C \text{ and } D]-[\text{allowed congestion length between } C \text{ and } D])$$

In the evaluation function f set as above, as the degree of achievement for the target value increases, the evaluation value becomes smaller.

The recommendation condition extraction unit 19 acquires the maximum congestion length between C and F and the maximum congestion length between C and D in the evaluation function f on the basis of the user movement estimation information sm as the simulation result generated for each recommendation condition candidate rcc. Then, the recommendation condition extraction unit 19 calculates an evaluation function value ev of each recommendation condition candidate rcc. Then, the recommendation condition extraction unit 19 extracts the recommendation condition candidate rcc with the smallest evaluation function value ev as the optimum recommendation condition. In the example shown in FIG. 10, the recommendation condition extraction unit 19 extracts the recommendation condition candidate No. 3 as the optimum recommendation condition.

The recommendation condition derivation model training unit 20 performs machine learning of the recommendation condition derivation model using the training data in which the target information relating to the movements of the users including the target values, the attribute information of each user, and the user position information are explanatory variables, and the optimum recommendation condition is an objective variable.

Figure 11:
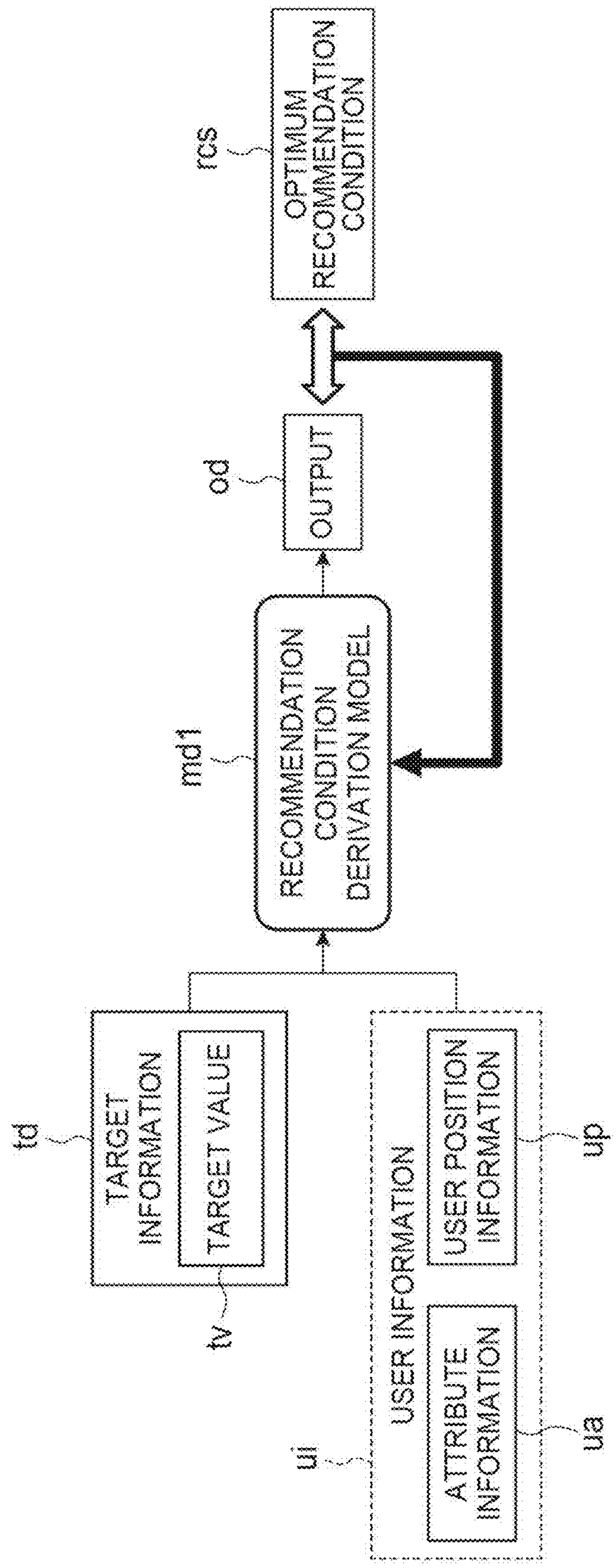
FIG. 11 is a diagram describing machine learning of the recommendation condition derivation model.

FIG. 11 is a diagram for describing the machine learning of the recommendation condition derivation model md1. The recommendation condition derivation model training unit 20 acquires output data od from the recommendation condition derivation model md1 by also inputting the target information td including the target values tv, the attribute information ua of the users, and the user information ui including the user position information up as explanatory variables into the recommendation condition derivation model md1. Then, the recommendation condition derivation model training unit 20 adjusts and updates weights and parameters constituting the recommendation condition derivation model md1 so that an error of the output data od with respect to the optimum recommendation condition rcs, which is the teacher data of the objective variable, is reduced, thereby performing the machine learning of the recommendation condition derivation model md1.

The model output unit 21 outputs the recommendation condition derivation model md1 that has already been trained by the recommendation condition derivation model training unit 20. Specifically, the model output unit 21 stores the trained recommendation condition derivation model md1 in the recommendation condition derivation model storage unit 34.

The recommendation condition derivation model md1, which is a model including a trained neural network, can be considered as a program that is read or referenced by a computer and causes the computer to execute a predetermined process and realize a predetermined function.

That is, the trained recommendation condition derivation model md1 of the present embodiment is used in a computer having a processor and a memory. Specifically, the processor of the computer operates to perform calculations based on trained weighting coefficients (parameters) corresponding to each layer, response functions, and the like for the input data (explanatory variables) input to an input layer of the neural network in accordance with instructions from the trained recommendation condition derivation model md1 stored in the memory, and to output results (probabilities or objective variables) from an output layer.

Figure 12:
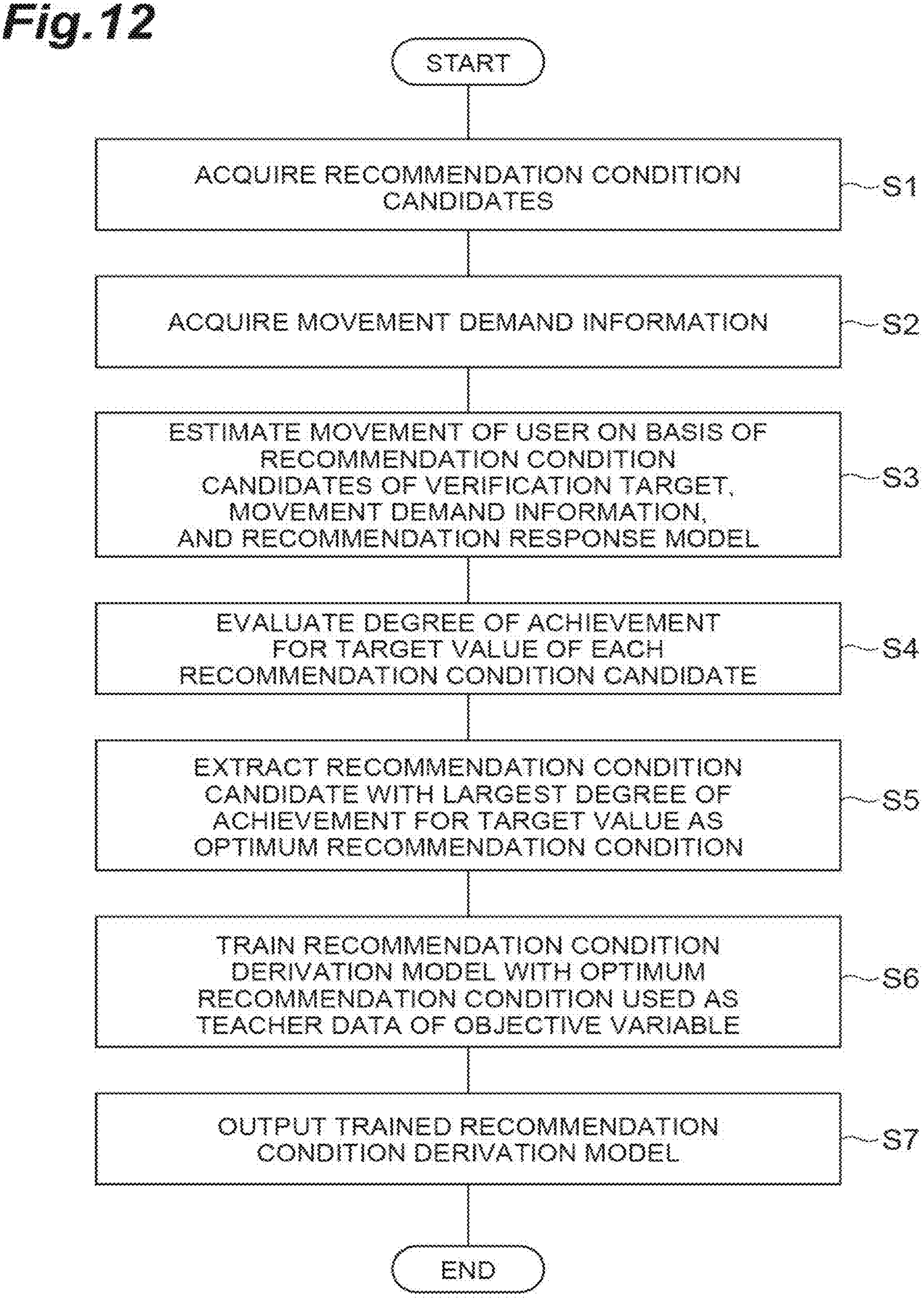
FIG. 12 is a flowchart showing processing content of a model generation method in the model generation apparatus.

FIG. 12 is a flowchart showing processing content of a model generation method in the model generation system 1. In step S1, the recommendation condition candidate generation unit 16 acquires the plurality of recommendation condition candidates with the information indicating the moving route as the constraint condition.

In step S2, the movement demand information acquisition unit 17 acquires the movement demand information indicating the transition of the positions through which each user has passed on the basis of the user position information including the positions through which the users have passed and the passing times at which they have passed through the positions.

In step S3, the user movement estimation unit 18 acquires the user movement estimation information by estimating the movements of the users on the basis of the transition of the positions of each user indicated by the movement demand information md and each of the recommendation condition candidates.

In step S4, the recommendation condition extraction unit 19 evaluates the degree of achievement for the target value, for example, by calculating the evaluation value, on the basis of the user movement estimation information sm of each recommendation condition candidate.

In step S5, the recommendation condition extraction unit 19 extracts the recommendation condition candidate with the largest degree of achievement for the target value as the optimum recommendation condition.

In step S6, the recommendation condition derivation model training unit 20 performs the machine learning of the recommendation condition derivation model using the training data in which the target information about the movements of the users including the target values, the attribute information of each user, and the user position information are the explanatory variables and the optimum recommendation condition is the objective variable.

In step S7, the model output unit 21 outputs the trained recommendation condition derivation model md1, for example by storing it in the recommendation condition derivation model storage unit 34.

Figure 13:
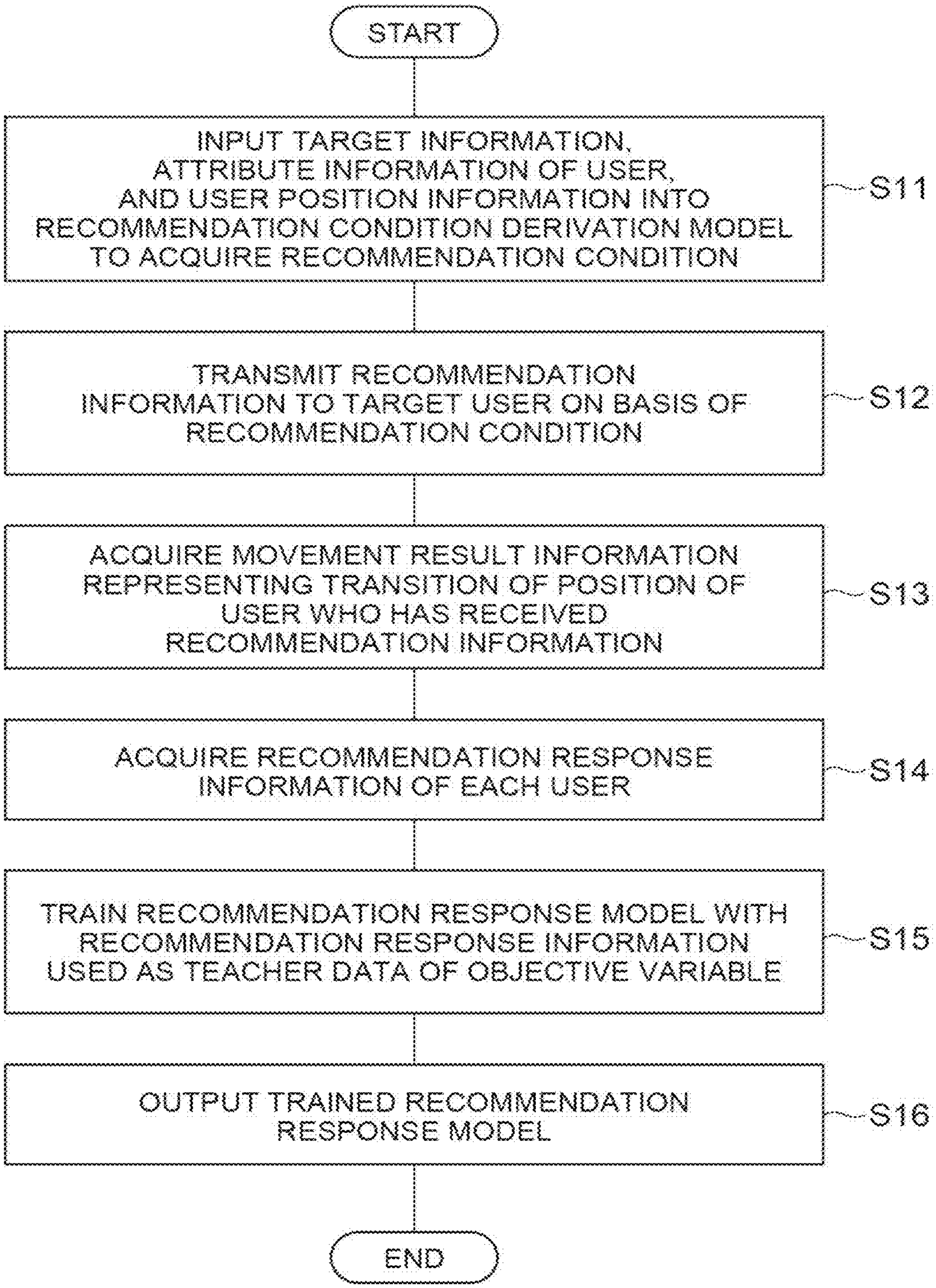
FIG. 13 is a flowchart showing a generation process of the recommendation response model.

FIG. 13 is a flowchart showing a process of generating the recommendation response model md2 used in step S3. In step S11, the recommendation condition acquisition unit 11 inputs the target information, the attribute information ua of each user, and the user position information up to the recommendation condition derivation model to acquire the recommendation condition rc.

In step S12, the recommendation information transmission unit 12 transmits the recommendation information to the target user indicated in the recommendation condition rc on the basis of the recommendation condition rc acquired by the recommendation condition acquisition unit 11 in step S11.

In step S13, the movement result information acquisition unit 13 acquires the movement result information indicating the transition of the positions through which each user has passed on the basis of the user position information up of each user. The movement result information acquired here is based on the position information indicating that each user has passed each node in a predetermined time after the time when the recommendation information was issued, which was expressed in response to the issuance of the recommendation information.

In step S14, the recommendation response information acquisition unit 14 acquires the recommendation response information indicating whether or not each user who has received the recommendation information has moved along the moving route indicated in the recommendation information on the basis of the movement result information tr.

In step S15, the recommendation response model generation unit 15 generates the recommendation response model by machine learning using the training data in which the attribute information of the users who have received the recommendation information, the user position information, and the recommendation condition as the explanatory variables and the recommendation response information ur of the users as the objective variables.

In step S16, the recommendation response model generation unit 15 outputs the trained recommendation response model md2, for example, by storing it in the recommendation response model storage unit 33.

Figure 14:
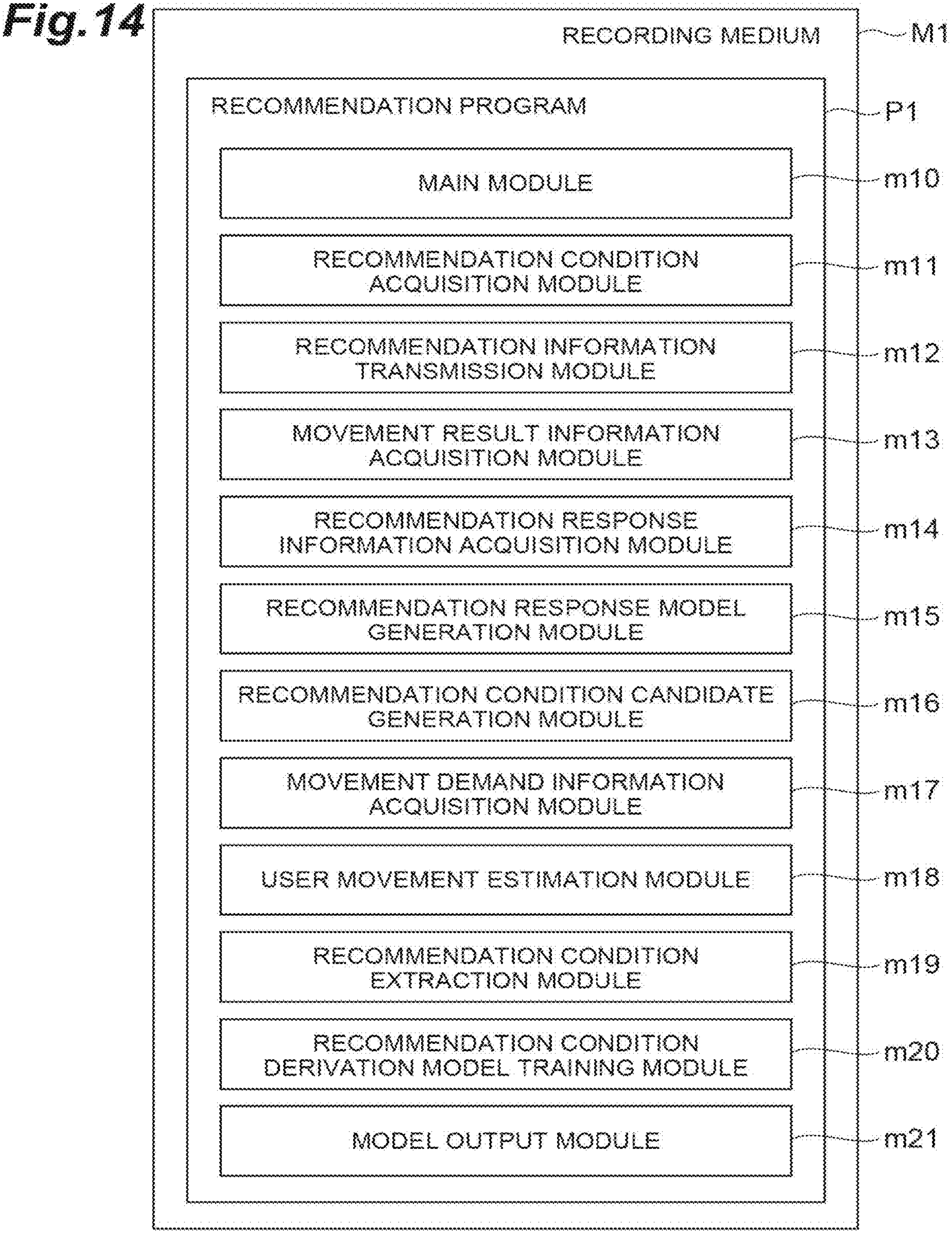
FIG. 14 is a diagram showing a configuration of a model generation program.

Next, a model generation program for causing a computer to function as the model generation apparatus 10 of the present embodiment will be described with reference to FIG. 14. FIG. 14 is a diagram showing a configuration of a model generation program P1. The model generation program P1 is configured to include a main module m10 that comprehensively controls the model generation process in the model generation apparatus 10, a recommendation condition acquisition module m11, a recommendation information transmission module m12, a movement result information acquisition module m13, a recommendation response information acquisition module m14, a recommendation response model generation module m15, a recommendation condition candidate generation module m16, a movement demand information acquisition module m17, a user movement estimation module m18, a recommendation condition extraction module m19, a recommendation condition derivation model training module m20, and a model output module m21. In addition, each of the modules m11 to m21 implements each function for each of the functional units 11 to 21.

Also, the model generation program P1 may be in a form of being transmitted via a transmission medium such as a communication line, or in a form of being stored in a recording medium M1 as shown in FIG. 14.

According to the model generation system, the model generation apparatus 10, the model generation method, and the model generation program P1 of the present embodiment described above, by simulating the movements of the users to whom the separately obtained recommendation response model is applied, the movements of the users when the recommendation condition candidates are issued are estimated and the user estimation information is obtained, and the degree of achievement for the target value of each recommendation condition candidate can be determined on the basis of the user estimation information, and thus the recommendation condition candidate with the largest degree of achievement for the target value can be extracted as the optimum recommendation condition. In addition, since the training data can be constructed with the target information, the attribute information of each user, and the user position information used as explanatory variables and the optimum recommendation condition used as the objective variable, it is possible to obtain a large amount of training data for machine learning of the recommendation information derivation model.

The model generation system according to the present disclosure may have the following configuration. Also, operations and effects of each configuration are described as follows.

The model generation system according to an aspect of the present disclosure is the model generation system configured to generate the recommendation condition derivation model that derives the recommendation conditions including at least the attribute information of the target user to whom the recommendation information relating to the moving route is provided and the information indicating the moving route, the system including: the recommendation condition candidate generation unit configured to acquire a plurality of recommendation condition candidates with the information indicating the moving route as the constraint condition; the user movement estimation unit configured to acquire the user movement estimation information by estimating the movements of the users on the basis of the transition of the positions of each user indicated by the movement demand information and each of the recommendation condition candidates, the movement demand information being information that is generated on the basis of the user position information including the positions through which the users have passed and the passing times at which the users have passed through the positions and that indicates the transition of the positions through which each user has passed, the movements of the users in the user movement estimation information being changed from the movements indicated by the transition of the user positions on the basis of the recommendation response estimation information, and the recommendation response estimation information being information that indicates whether or not the users will move along the moving route indicated in the recommendation information in a case in which the users are provided with the recommendation information indicated in the recommendation condition candidates and is acquired on the basis of the recommendation response model that outputs the recommendation response estimation information with at least the user position information including the positions through which the users have passed and the passing times and the recommendation conditions as input; the recommendation condition extraction unit configured to extract, as the optimum recommendation condition, the recommendation condition candidate with the largest degree of achievement for a given target value relating to the movements of the users on the basis of the user movement estimation information for each of the recommendation condition candidates; and the recommendation condition derivation model training unit configured to perform machine learning of the recommendation condition derivation model using the training data in which the target information relating to the movements of the users including the target value, the attribute information of each user, and the user position information are explanatory variables, and the optimum recommendation condition is the objective variable.

According to the above aspect, by simulating the movements of the users to whom the separately obtained recommendation response model is applied, the user movement estimation information can be obtained by estimating the movements of the users when the recommendation condition candidates are issued, and the degree of achievement for the target value for each of the recommendation condition candidates can be determined on the basis of the user movement estimation information, and thus the recommendation condition candidate with the largest degree of achievement for the target value can be extracted as the optimum recommendation condition. In addition, since the training data can be configured with the target information, the attribute information of each user, and the user position information used as the explanatory variables, and the optimum recommendation condition used as the objective variable, it is possible to obtain a large amount of training data for machine learning of the recommendation information derivation model.

Also, in the model generation system according to another aspect, the recommendation response estimation information may include a recommendation response rate, and the recommendation response rate may be a probability of moving along the moving route indicated in the recommendation information when the users are provided with the recommendation information indicated in the recommendation condition candidates.

According to the above aspect, since the recommendation response estimation information includes the recommendation response rate, and the movements of the users are estimated in accordance with the recommendation response rate, highly accurate user movement estimation information is acquired.

Also, the model generation system according to another aspect may further include: the recommendation information transmission unit configured to transmit the recommendation information to the target user indicated by the recommendation conditions on the basis of the recommendation conditions acquired by inputting the target information, the attribute information of each user and the user position information into the recommendation condition derivation model; the recommendation response information acquisition unit configured to acquire the recommendation response information indicating whether or not the users who have received the recommendation information have moved along the moving route indicated in the recommendation information on the basis of the movement result information that is acquired on the basis of the user position information of each user and that indicates the transition of the positions through which each user has passed; and the recommendation response model generation unit configured to generate the recommendation response model by machine learning using the training data in which the attribute information of the users who have received the recommendation information, the user position information, and the recommendation conditions are the explanatory variables, and the recommendation response information of the users is the objective variable.

According to the above aspect, since the recommendation response information indicating whether or not the users have followed the recommendation information can be obtained on the basis of the transition of the positions of the users who have received the recommendation information, the training data using the information about the users and the recommendation conditions as the explanatory variables and the recommendation response information as the objective variable can be constructed. Accordingly, the recommendation response model can be generated by machine learning using the constructed training data.

Also, in the model generation system according to another aspect, the recommendation response information acquisition unit may acquire the recommendation response information by determining, on the basis of the movement result information, whether or not the users have moved along the moving route indicated in the recommendation information.

According to the above aspect, since the determination of whether or not the users have moved along the moving route is performed on the basis of the movement result information, highly accurate recommendation response information can be obtained.

Also, in the model generation system according to another aspect, the recommendation response information acquisition unit may acquire the recommendation response information on the basis of the information transmitted by the users who have received the recommendation.

According to the above aspect, since the determination of whether or not the users have moved along the moving route on the basis of the information received from the terminals of the users, the recommendation response information can be easily acquired.

Also, the model generation system according to another aspect may further include the recommendation condition acquisition unit configured to input the target information, the attribute information of each user, and the user position information to the recommendation condition derivation model to acquire the recommendation conditions, and the recommendation information transmission unit may transmit the recommendation information on the basis of the recommendation conditions acquired by the recommendation condition acquisition unit.

According to the above aspect, since the recommendation information is transmitted to the target user in accordance with the recommendation conditions obtained from the recommendation condition derivation model, the recommendation response information can be obtained on the basis of the movement result information indicating the transition of the positions of the users generated as a result thereof. Thus, construction of the training data for machine learning of the recommendation response model is possible.

Also, in the model generation system according to another aspect, the recommendation response model may be configured by a logistic regression model, in which the attribute information of the users, the user position information, and the recommendation condition are used as the explanatory variables and the recommendation response information based on the probability of the users' moving along the moving route indicated by the recommendation information is used as the objective variable.

According to the above aspect, the recommendation response model is configured by the logistic regression model. Accordingly, highly accurate estimation of the recommendation response information is possible.

Also, in the model generation system according to another aspect, the recommendation condition candidate generation unit may generate the plurality of recommendation condition candidates obtained by randomly varying items of conditions other than the constraint condition relating to the moving route.

According to the above aspect, it is possible to easily generate a large number of recommendation condition candidates to be used as the training data for machine learning of the recommendation condition derivation model.

Further, the block diagram shown in FIG. 1 shows functional unit blocks. These functional blocks (constituent units) are realized by any combination of at least one of hardware and software. Also, a method for realizing each functional block is not particularly limited. That is, each functional block may be realized using one apparatus that is physically or logically combined, or may be realized by directly or indirectly (for example, in a wired or wireless manner, or the like) connecting two or more apparatuses that are physically or logically separated and using these plurality of apparatuses. The functional blocks may be realized by combining the one apparatus or the plurality of apparatuses with software.

The functions include determining, deciding, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating or mapping, assigning, and the like, but are not limited thereto. For example, a functional block (constituent unit) that operates a transmission function is called a transmitting unit or a transmitter. In either case, as described above, the method for realizing it is not particularly limited.

Figure 15:
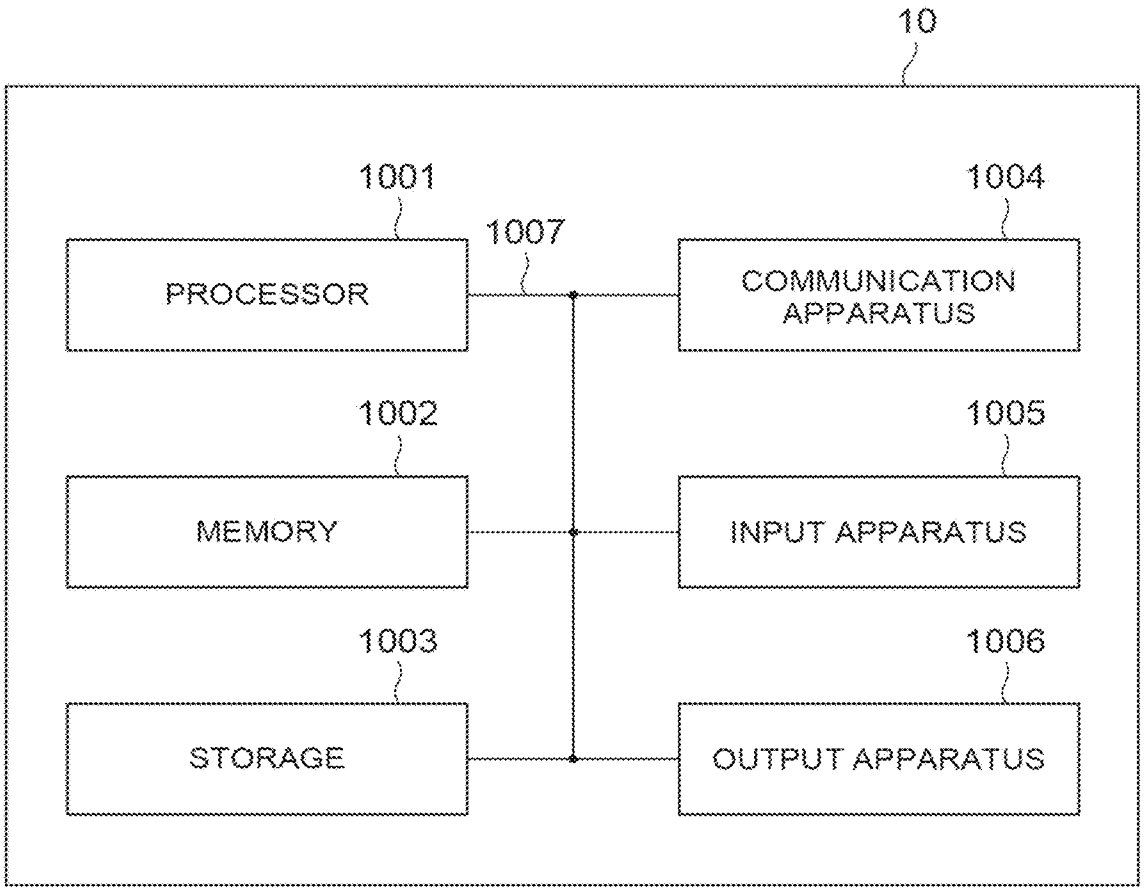
FIG. 15 is a hardware block diagram of the model generation apparatus.

For example, the model generation apparatus 10 according to one embodiment of the present invention may function as a computer. FIG. 15 is a diagram showing an example of a hardware configuration of the model generation apparatus 10 according to the present embodiment. The model generation apparatus 10 may be physically configured as a computer apparatus including a processor 1001, a memory 1002, a storage 1003, a communication apparatus 1004, an input apparatus 1005, an output apparatus 1006, a bus 1007, and the like.

In addition, in the following description, the term "apparatus" may be replaced with circuit, device, unit, or the like. The hardware configuration of the model generation apparatus 10 may be configured to include one or more of the apparatuses shown in the figure, or may not include some of the apparatuses.

Each function of the model generation apparatus 10 can be realized by loading predetermined software (program) onto hardware such as the processor 1001 and the memory 1002, causing the processor 1001 to perform calculations and controlling communication using the communication apparatus 1004 or controlling reading and/or writing of data in the memory 1002 and the storage 1003.

The processor 1001, for example, operates an operating system to control the entire computer. The processor 1001 may be configured by a central processing unit (CPU) including an interface with peripheral apparatuses, a control apparatus, an arithmetic apparatus, a register, and the like. For example, each of the functional units 11 to 21 and the like shown in FIG. 1 may be realized by the processor 1001.

Also, the processor 1001 reads out a program (program codes), a software module, and data from the storage 1003 and/or the communication apparatus 1004 into the memory 1002 and executes various processes in accordance with them. For the program, a program for causing a computer to execute at least some of the operations described in the embodiment described above is used. For example, the functional units 11 to 21 of the model generation apparatus 10 may be realized by a control program which is stored in the memory 1002 and operated in the processor 1001. Although the various processes described above have been described as being executed by one processor 1001, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of at least one of, for example, a read only memory (ROM), an erasable programmable ROM (EPROM), an electrically erasable programmable ROM (EEPROM), a random access memory (RAM), and the like. The memory 1002 may also be called a register, a cache, a main memory (main storage apparatus), or the like. The memory 1002 can store programs (program codes), software modules, and the like that are executable for performing the model generation method according to one embodiment of the present invention.

The storage 1003 is a computer-readable recording medium and may be configured of at least one of, for example, an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be called an auxiliary storage apparatus. The above-described storage medium may be, for example, a database, a server, or another suitable medium including the memory 1002 and/or the storage 1003.

The communication apparatus 1004 is hardware (a transmission and reception apparatus) for communicating between computers via a wired and/or wireless network, and is also referred to as, for example, a network device, a network controller, a network card, a communication module, or the like.

The input apparatus 1005 is an input apparatus that receives input from the outside (for example, a keyboard, a mouse, a microphone, a switch, buttons, a sensor, or the like). The output apparatus 1006 is an output apparatus (for example, a display, a speaker, an LED lamp, or the like) that performs output to the outside. In addition, the input apparatus 1005 and the output apparatus 1006 may have an integrated configuration (for example, a touch panel).

Also, the respective apparatuses such as the processor 1001 and the memory 1002 are connected to each other via the bus 1007 for communication of information. The bus 1007 may be configured as a single bus or may be configured as different buses between the apparatuses.

Further, the model generation apparatus 10 may be configured to include hardware such as a microprocessor, a digital signal processor (DSP), an application specific integrated circuit (ASIC), a programmable logic device (PLD), or a field-programmable gate array (FPGA), and some or all of the functional blocks may be realized by the hardware. For example, the processor 1001 may be mounted as at least one of these pieces of hardware.

Notification of information is not limited to the aspects or embodiments described in the present disclosure, and may be performed using another method. For example, the notification of information may be implemented using physical layer signaling (for example, downlink control information (DCI) or uplink control information (UCI)), upper layer signaling (for example, radio resource control (RRC) signaling, medium access control (MAC) signaling, or notification information (master information block (MIB) or system information block (SIB))), other signals, or a combination of these. Also, the RRC signaling may be called an RRC message and may be, for example, an RRC connection setup message, an RRC connection reconfiguration message, or the like.

Each aspect or embodiment described in the present disclosure may be applied to at least one of long term evolution (LTE), LTE-advanced (LTE-A), Super 3G, IMT-advanced, a 4th generation mobile communication system (4G), a 5th generation mobile communication system (5G), future ratio access (FRA), new radio (NR), W-CDMA (registered trademark), GSM (registered trademark), CDMA 2000, ultra mobile broadband (UMB), IEEE 802.11 (Wi-Fi (registered trademark)), IEEE 802. 16 (WiMAX (registered trademark)), IEEE 802. 20, ultra-wideband (UWB), Bluetooth (registered trademark), a system using another appropriate system, and a next generation system extended based on these. In addition, a plurality of systems may be combined (for example, a combination of at least one of LTE and LTE-A and 5G, or the like) and applied.

The order of processing procedures, sequences, flowcharts, or the like of the aspects or embodiments described above in the present disclosure may be changed as long as there is no contradiction. For example, in the method described in the present disclosure, various step elements are presented using an exemplary order and are not limited to the particular order presented.

Specific operations performed by a base station in the present disclosure may be performed by its upper node in some cases. It is clear that, in a network consisting of one or more network nodes having a base station, various operations performed for communication with terminals may be performed by at least one of the base station and other network nodes other than the base station (for example, MME, S-GW, or the like is conceivable, but not limited thereto). Although a case in which there is one other network node other than the base station has been exemplified above, it may be a combination of a plurality of other network nodes (for example, MME and S-GW).

Information and the like (see the "information and signals" section) may be output from an upper layer (or a lower layer) to a lower layer (or an upper layer). It may be input and output via a plurality of network nodes.

The input and output information and the like may be stored in a specific location (for example, a memory) or may be managed using a management table. The input and output information and the like may be overwritten, updated, or added. The output information and the like may be deleted. The input information and the like may be transmitted to another apparatus.

Determining may be performed using a value represented by one bit ("0" or "1"), may be performed using a Boolean (true or false), or may be performed by comparison between numerical values (for example, a comparison with a predetermined value).

Each aspect or embodiment described in the present disclosure may be used alone, may be used in combination, or may be switched during implementation. Also, notification of predetermined information (for example, notification that "X is the case") is not limited to being performed explicitly and may be performed implicitly (for example, notification of the predetermined information is not performed).

Although the present disclosure has been described in detail above, it is clear to those skilled in the art that the present disclosure is not limited to the embodiment described herein. The present disclosure may be modified and altered without departing from the spirit and scope of the present disclosure as defined by the claims. Accordingly, the description of the present disclosure is for illustrative purposes only and is not intended to be limiting of the present disclosure.

Whether referred to as software, firmware, middleware, microcode, hardware description language, or otherwise, software should be broadly construed to mean instructions, instruction sets, code, code segments, program code, programs, subprograms, software modules, applications, software applications, software packages, routines, subroutines, objects, executable files, threads of execution, procedures, functions, and the like.

Also, software, instructions, and the like may be transmitted and received via a transmission medium. For example, when software is transmitted from a website, a server, or another remote source using wired technologies such as a coaxial cable, a fiber optic cable, a twisted pair, and a digital subscriber line (DSL), and/or wireless technologies such as infrared rays, radio waves, and microwave, these wired and/or wireless technologies are included within the definition of transmission medium.

Information, signals, and the like described in the present disclosure may be represented using any of a variety of different technologies. For example, data, instructions, commands, information, signals, bits, symbols, chips, and the like that may be referred to throughout the above description may be expressed by voltages, currents, electromagnetic waves, magnetic fields or magnetic particles, optical fields or photons, or any combination thereof.

Also, terms described in the present disclosure and/or terms required for understanding the present disclosure may be substituted with terms having the same or similar meanings.

The terms "system" and "network" used in the present disclosure are used interchangeably.

In addition, information, parameters, and the like described in the present disclosure may be expressed using absolute values, may be expressed using relative values from a predetermined value, or may be expressed using other corresponding information. For example, a radio resource may be indicated by an index.

The names used for the parameters described above are not limiting in any way. Further, the formulas using these parameters may differ from those explicitly disclosed in the present disclosure. Since various channels (for example, PUCCH, PDCCH, and the like) and information elements can be identified by any suitable names, various names assigned to these various channels and information elements are not intended to be limiting in any way.

The term “determining” or “deciding” as used in the present disclosure may encompass a wide variety of actions. The “determining” or “deciding” may include, for example, actions or the like regarded as “determining” or “deciding” something obtained by judging, calculating, computing, processing, deriving, investigating, looking up (search or inquiry) (for example, searching in a table, database, or other data structure), or ascertaining. Also, the “determining” or “deciding” may include actions or the like regarded as “determining” or “deciding” something obtained by receiving (for example, receiving information), transmitting (for example, transmitting information), input, output, or accessing (for example, accessing data in a memory). In addition, the “determining” or “deciding” may include actions regarded as “determining” or “deciding” something obtained by resolving, selecting, choosing, establishing, comparing, or the like. That is, the “determining” or “deciding” may include actions that are regarded as “determining” or “deciding” a certain operation. Further, the “determining (deciding)” may be replaced with “assuming”, “expecting”, “considering”, or the like.

The expression “on the basis of” used in the present disclosure does not mean “only on the basis of” unless otherwise specified. In other words, the expression “on the basis of” means both “only on the basis of” and “at least on the basis of.”

When designations such as “first,” “second,” and the like are used in the present disclosure, any reference to those elements is not intended to generally limit the quantity or order of those elements. These designations may be used herein as a convenient way of distinguishing between two or more elements. Accordingly, reference to a first and a second element does not imply that only two elements may be employed therein or that the first element must precede the second element in some manner.

The term “means” in the configurations of each apparatus mentioned above may be replaced with “part,” “circuit,” “device,” and the like.

To the extent that “include,” “including,” and variations thereof are used in the present specification or claims, these terms are intended to be inclusive, as is the term “comprising.” Further, the term “or” as used in the present specification or claims is not intended to be an exclusive or.

In the present disclosure, for example, when an article such as a, an, or the in English is added in translation, the present disclosure may include a case in which a noun subsequent to the article is in the plural form.

In the present disclosure, the expression “A and B are different” may mean that “A and B are different from each other.” Also, the expression may mean that “A and B are different from C.” Terms such as “separated” and “combined” may also be construed in the same way as “different.”

The model generation system 1 of the present disclosure may have the following configuration.

[1] A model generation system configured to generate a recommendation condition derivation model that derives recommendation conditions including at least attribute information of a target user to whom recommendation information relating to a moving route is provided and information indicating the moving route, the system including:

- a recommendation condition candidate generation unit configured to acquire a plurality of recommendation condition candidates with the information indicating the moving route as a constraint condition;
- a user movement estimation unit configured to acquire user movement estimation information by estimating movements of users on the basis of transition of positions of the users indicated by movement demand information and each of the recommendation condition candidates,
- the movement demand information being information that is generated on the basis of user position information including the positions through which the users have passed and passing times at which the users have passed through the positions and that indicates transition of the positions through which each user has passed,
- the movements of the users in the user movement estimation information being changed from movements indicated by the transition of the user positions on the basis of recommendation response estimation information, and
- the recommendation response estimation information being information that indicates whether or not the users will move along the moving route indicated in the recommendation information in a case in which the users are provided with the recommendation information indicated in the recommendation condition candidates and is acquired on the basis of the recommendation response model that outputs the recommendation response estimation information with at least the user position information including the positions through which the users have passed and the passing times and the recommendation conditions as input;
- the recommendation condition extraction unit configured to extract, as an optimum recommendation condition, the recommendation condition candidate with the largest degree of achievement for a given target value relating to the movements of the users on the basis of the user movement estimation information for each of the recommendation condition candidates; and
- the recommendation condition derivation model training unit configured to perform machine learning of the recommendation condition derivation model using training data in which target information relating to the movements of the users including the target value, attribute information of each user, and the user position information are explanatory variables, and the optimum recommendation condition is an objective variable.

[2] The model generation system according to [1], wherein

- the recommendation response estimation information includes a recommendation response rate, and
  - the recommendation response rate is a probability of moving along the moving route indicated in the recommendation information in a case in which the user is provided with the recommendation information indicated in the recommendation condition candidates.

[3] The model generation system according to [1] or [2], further including:

- a recommendation information transmission unit configured to transmit the recommendation information to the target user indicated by the recommendation conditions on the basis of the recommendation conditions acquired by inputting the target information, the attribute information of each user and the user position information into the recommendation condition derivation model;
- a recommendation response information acquisition unit configured to acquire recommendation response information indicating whether or not the users who have received the recommendation information have moved along the moving route indicated in the recommendation information on the basis of movement result information that is acquired on the basis of the user position information of each user and that indicates the transition of the positions through which each user has passed; and a recommendation response model generation unit configured to generate the recommendation response model by machine learning using the training data in which the attribute information of the users who have received the recommendation information, the user position information, and the recommendation conditions are explanatory variables, and the recommendation response information of the users is an objective variable.

[4] The model generation system according to [3], wherein the recommendation response information acquisition unit acquires the recommendation response information by determining, on the basis of the movement result information, whether or not the users has moved along the moving route indicated in the recommendation information.

[5] The model generation system according to [3], wherein the recommendation response information acquisition unit acquires the recommendation response information on the basis of information transmitted by the user who has received the recommendation.

[6] The model generation system according to any one of [3] to [5], further including:

a recommendation condition acquisition unit configured to input the target information, the attribute information of each user, and the user position information to the recommendation condition derivation model to acquire the recommendation conditions, wherein the recommendation information transmission unit transmits the recommendation information on the basis of the recommendation conditions acquired by the recommendation condition acquisition unit.

[7] The model generation system according to any one of [3] to [6], wherein the recommendation response model is configured by a logistic regression model, in which the attribute information of the users, the user position information, and the recommendation conditions are used as the explanatory variables and the recommendation response information based on the probability of the users' moving along the moving route indicated by the recommendation information is used as the objective variable.

[8] The model generation system according to any one of [1] to [7], wherein the recommendation condition candidate generation unit generates the plurality of recommendation condition candidates obtained by randomly varying items of conditions other than the constraint condition relating to the moving route.

REFERENCE SIGNS LIST

1 Model generation system, 10 Model generation apparatus, 11 Recommendation condition acquisition unit, 12 Recommendation information transmission unit, 13 Movement result information acquisition unit, 14 Recommendation response information acquisition unit, 15 Recommendation response model generation unit, 16 Recommendation condition candidate generation unit, 17 Movement demand information acquisition unit, 18 User movement estimation unit, 19 Recommendation condition extraction unit, 20 Recommendation condition derivation model training unit, 21 Model output unit, 31 User position information storage unit, 32 User attribute information storage unit, 33 Recommendation response model storage unit, 34 Recommendation condition derivation model storage unit, M1 Recording medium, m11 Recommendation condition acquisition module, m12 Recommendation information transmission module, m13 Movement result information acquisition module, m14 Recommendation response information acquisition module, m15 Recommendation response model generation module, m16 Recommendation condition candidate generation module, m17 Travel demand information acquisition module, m18 User movement estimation module, m19 Recommendation condition extraction module, m20 Recommendation condition derivation model training module, m21 Model output module, md1 Recommendation condition derivation model, md2 Recommendation response model, P1 Model generation program

The invention claimed is:

1. A model generation system configured to generate a recommendation condition derivation model that derives recommendation conditions including at least attribute information of a target user to whom recommendation information relating to a moving route is provided and information indicating the moving route, the system comprising:

a recommendation condition candidate generation unit configured to acquire a plurality of recommendation condition candidates with the information indicating the moving route as a constraint condition;

a user movement estimation unit configured to acquire user movement estimation information by estimating movements of users on the basis of transition of positions of the users indicated by movement demand information and each of the recommendation condition candidates, the movement demand information being information that is generated on the basis of user position information including the positions through which the users have passed and passing times at which the users have passed through the positions and that indicates transition of the positions through which each user has passed, the movements of the users in the user movement estimation information being changed from movements indicated by the transition of the user positions on the basis of recommendation response estimation information, and the recommendation response estimation information being information that indicates whether or not the users will move along the moving route indicated in the recommendation information in a case in which the users are provided with the recommendation information indicated in the recommendation condition candidates and is acquired on the basis of the recommendation response model that outputs the recommendation response estimation information with at least the user position information including the positions through which the users have passed and the passing times and the recommendation conditions as input;

a recommendation condition extraction unit configured to extract, as an optimum recommendation condition, the recommendation condition candidate with the largest degree of achievement for a given target value relating to the movements of the users on the basis of the user movement estimation information for each of the recommendation condition candidates; and a recommendation condition derivation model training unit configured to perform machine learning of the recommendation condition derivation model using training data in which target information relating to the movements of the users including the target value, attribute information of each user, and the user position information are explanatory variables, and the optimum recommendation condition is an objective variable.

2. The model generation system according to claim 1, wherein the recommendation response estimation information includes a recommendation response rate, and the recommendation response rate is a probability of moving along the moving route indicated in the recommendation information in a case in which the user is provided with the recommendation information indicated in the recommendation condition candidates.

3. The model generation system according to claim 1, further comprising:

a recommendation information transmission unit configured to transmit the recommendation information to the target user indicated by the recommendation conditions on the basis of the recommendation conditions acquired by inputting the target information, the attribute information of each user and the user position information into the recommendation condition derivation model;

a recommendation response information acquisition unit configured to acquire recommendation response information indicating whether or not the users who have received the recommendation information have moved along the moving route indicated in the recommendation information on the basis of movement result information that is acquired on the basis of the user position information of each user and that indicates the transition of the positions through which each user has passed; and a recommendation response model generation unit configured to generate the recommendation response model by machine learning using the training data in which the attribute information of the users who have received the recommendation information, the user position information, and the recommendation conditions are explanatory variables, and the recommendation response information of the users is an objective variable.

4. The model generation system according to claim 3, wherein the recommendation response information acquisition unit acquires the recommendation response information by determining, on the basis of the movement result information, whether or not the user has moved along the moving route indicated in the recommendation information.

5. The model generation system according to claim 3, wherein the recommendation response information acquisition unit acquires the recommendation response information on the basis of information transmitted by the user who has received the recommendation.

6. The model generation system according to claim 3, further comprising:

a recommendation condition acquisition unit configured to input the target information, the attribute information of each user, and the user position information to the recommendation condition derivation model to acquire the recommendation conditions, wherein the recommendation information transmission unit transmits the recommendation information on the basis of the recommendation conditions acquired by the recommendation condition acquisition unit.

7. The model generation system according to claim 3, wherein the recommendation response model is configured by a logistic regression model, in which the attribute information of the users, the user position information, and the recommendation conditions are used as the explanatory variables and the recommendation response information based on the probability of the users' moving along the moving route indicated by the recommendation information is used as the objective variable.

8. The model generation system according to claim 1, wherein the recommendation condition candidate generation unit generates the plurality of recommendation condition candidates obtained by randomly varying items of conditions other than the constraint condition relating to the moving route.

* * * * *